United States Patent [19]

Farel et al.

[11] Patent Number: 5,067,074
[45] Date of Patent: Nov. 19, 1991

[54] CONTROL OF OVERLOAD IN COMMUNICATIONS NETWORKS

[75] Inventors: Richard A. Farel, Englishtown; Mohan Gawande, East Windsor, both of N.J.

[73] Assignee: AT&T Bell Laboratories, Murray Hill, N.J.

[21] Appl. No.: 428,268

[22] Filed: Oct. 27, 1989

[51] Int. Cl.[5] .......................................... H04M 11/00
[52] U.S. Cl. .................................. 395/200; 364/222.2; 364/284; 364/284.3; 364/DIG. 1; 370/13; 379/113
[58] Field of Search .................. 364/222.2, 282.1, 284, 364/284.3; 370/13; 379/113, 137, 138

[56] References Cited

U.S. PATENT DOCUMENTS 4,626,624 12/1986 Daisenberger ................ 379/137
4,626,625 12/1986 Daisenberger ................ 379/137
4,974,256 12/1990 Cyr et al. ...................... 379/113

OTHER PUBLICATIONS

D. G. Haenschke et al., "Network Management and Congestion in the U.S. Telecommunications Network", *IEEE Transactions On Communications*, vol. COM-28, No. 4, Apr. 1981, pp. 376-385.

Primary Examiner—Salvatore Cangialosi
Attorney, Agent, or Firm—W. Ulrich

[57] ABSTRACT

This invention relates to a method and apparatus for throttling request messages to an overloaded database and for throttling overload traffic to a particular destination. The database sends a gap value to the sources of messages or traffic; following any message or call to the destination, no messages will be sent or calls to the destination completed for one gap interval. In a departure from the prior art, the gap interval, a function of the number of request messages flushed or overload calls to the destination is not recurrently calculated anew, but is instead recurrently adjusted from its previous value. Advantageously, this arrangement permits a relatively stable value of the gap to be maintained and reduces overhead for preliminary processing of request messages that cannot be handled.

15 Claims, 2 Drawing Sheets

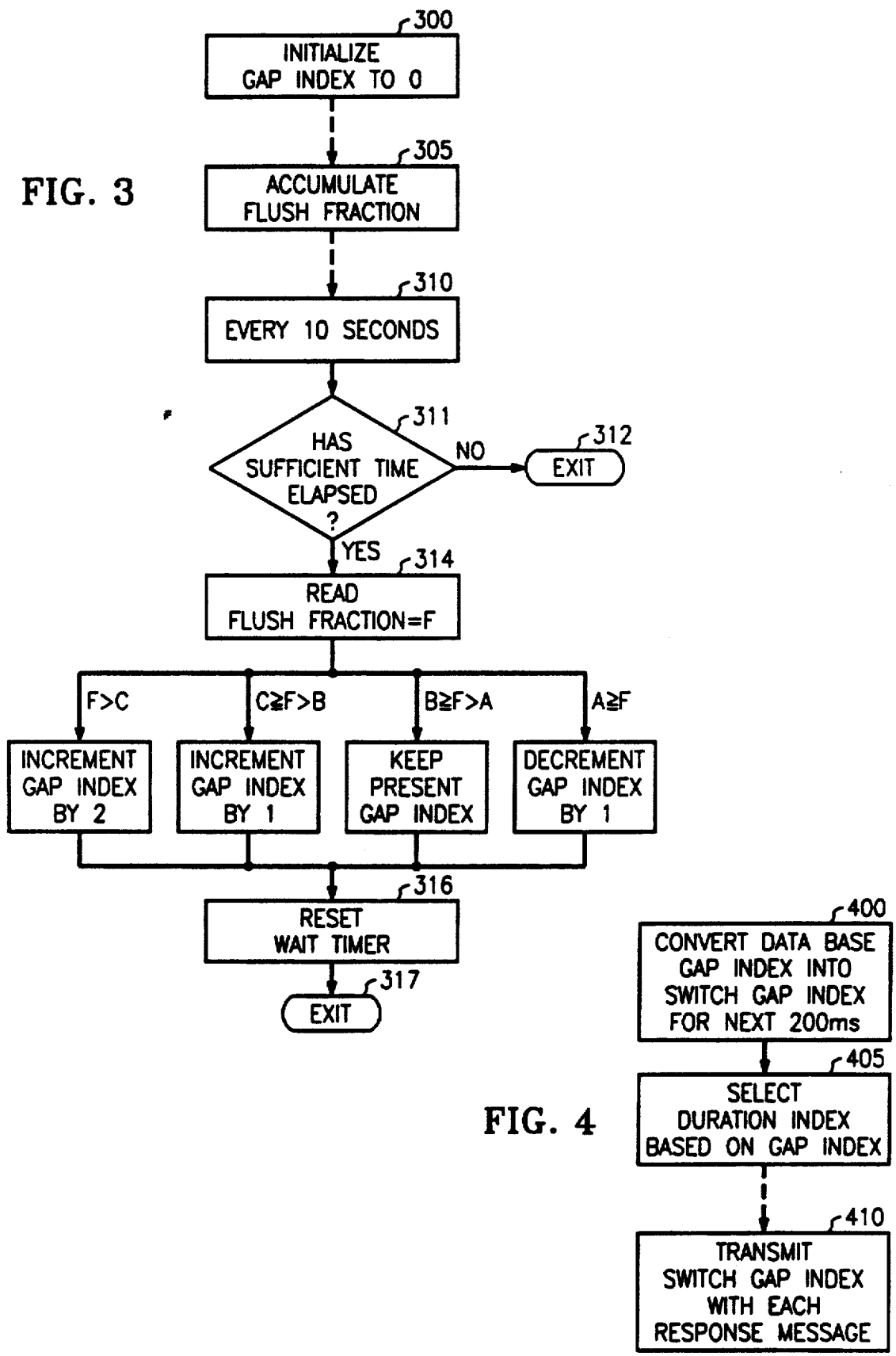

CONTROL OF OVERLOAD IN COMMUNICATIONS NETWORKS

TECHNICAL FIELD

This invention relates to a method and apparatus for controlling overload in communications networks.

PROBLEM

Centralized databases have become critical to the operation of modern communications networks. For many of the services offered by these networks such as "800"or "Freephone" service, a call cannot be completed without obtaining the information for routing the call to its destination from such a centralized database. When an 800 call is placed, the call is routed from a local switching system to a toll switching system and the toll switching system sends a query message to one of a plurality of centralized databases. One or more signal transfer points are interposed between the toll switch and the plurality of databases to route the request message to the appropriate one of these centralized databases based on a destination group. The centralized database responds with the information necessary for routing the call. If the centralized database fails to respond within a prespecified interval, then the call is routed to overflow tone, the calling customer is annoyed and will usually reattempt the call shortly. These re-attempts cause further load to be placed on the centralized database thus aggravating an existing overload condition. It is therefore important to ensure that overloads to centralized databases are carefully controlled in order to avoid creating this aggravated condition.

In the prior art systems, a database handles overload in approximately the following manner: the database keeps track of the number of request messages received and maintains a parameter of the approximate number of messages which can be processed per unit time. If more messages are received than can be processed per unit time, the excess messages are discarded or "flushed". The process of flushing messages takes an appreciable amount of the real time, however, so that in conditions of extreme overload, a large fraction of the real time of the database is actually spent in flushing messages which will not be processed. In addition, measures are taken to try to control messages at the sources which send the query messages. These sources are the various toll switches of the communication network that received the traffic and generate the request messages to the database. In the prior art, when the database is in overload and receives a message from a particular toll switch, the message being a request for routing to a particular destination group, the database as part of its response message sends an indication to the toll switch to reduce the message load for traffic to that destination group in accordance with parameters supplied in the response message. These parameters are used by the toll switch to look up a gap and a duration time interval which are used as follows. Following the acceptance of a call, no more calls to that destination group will be accepted for one gap interval. Thereafter, another call will be accepted and then no more calls will be accepted for of another gap interval. These gap intervals are applied during the length of time of the duration interval unless changed by a subsequent message. These controls are applied individually per destination group, rather than collectively to all destination groups served by the toll switch, because in many cases these overloads are generated by flurries of traffic to a particular destination, especially flurries of traffic to a destination which itself is overloaded and which cannot accept more calls. Because only overloaded databases request control, the toll switches will only control messages destined for overloaded databases and will not affect messages destined for other databases which are not overloaded. Further, among the destination groups served by the overloaded databases, there will be a tendency to control those destinations which themselves are in overload most strongly, since in a gapping control a much larger fraction of calls are discarded from heavy traffic sources than from light traffic sources. Thus, only that portion of the traffic which cannot be adequately served is subjected to the overload control.

Since a database can be subjected to a wide variety of overload conditions, some mild, some extreme, some focused from a few sources, some generated by a large number of sources, the particular gap and duration interval required to properly control traffic can differ widely from one overload to the next. To cover the potential range from 0.1 second to 600 seconds the toll switches are equipped with a zero size gap plus 15 gap and duration interval sizes which differ by approximately a factor of 2. Since choice of the wrong gap and duration intervals will result in either undercontrol or overcontrol, it is important that the database be able to select the best values for the given situation. In the prior art, the choice was made based on a table lookup using the fraction of flushed messages as the index.

A problem with this overall arrangement is that in order to retain a large gap it is necessary to handle a situation in which the database is subject to high overload from a large number of sources; when this happens, the database must reject large numbers of calls, thus wasting much of its time and reducing the number of request messages which it can process. Moreover, the arrangement tends to be highly unstable, swinging from excessively heavy overload control to excessively light overload control because a large gap sharply reduces the number of request messages, leading to a much lower flush fraction and gap, leading to another surge in traffic, and so on, with the result that many more request messages are rejected than under optimum operation. A problem of the prior art, therefore, is that the arrangements for controlling overload of request messages received at centralized databases are such that the centralized database does not process messages up to its capacity.

SOLUTION

In accordance with the principles of this invention, an advance is made over the prior art by having an arrangement wherein the database adjusts the present value of a gap up or down in accordance with the present fraction of flushed request messages instead of setting an absolute value of the gap. Advantageously, such an arrangement permits the database to dynamically adjust the gap value in small increments, constantly searching for the optimum value of the gap. Advantageously, it is not necessary for the database to waste substantial resources in rejecting a high fraction of incoming messages in order to maintain a high value of a gap necessary to reduce the incoming message volume to a value that can be handled by the database; most calls that need to be rejected are rejected by the toll switch without ever sending a message to the database. By rejecting calls at the switch, the signal transfer points are also less heavily loaded since they do not need to route large numbers of messages which will subsequently be rejected at the database.

In accordance with one aspect of the invention, the selected gap size is such as to cause some fraction of message traffic to be rejected at the database if the database is not in fact capable of processing all of the traffic offered to the toll switches. By selecting that gap size, the amount of traffic unnecessarily rejected at the toll switch is minimized. The optimum choice of gap is the largest gap which still rejects some messages at the database since with this gap no calls are unnecessarily denied at the toll switch. Thus, whenever the amount of request messages rejected at the database goes to 0, the gap size, if not already 0, is decreased by one increment.

In accordance with another aspect of the invention, the parameter reflecting the fraction of messages flushed at the database before increasing the gap size is a function of the ratio between adjacent gap sizes. Thus, when adjacent values of the gap differ by only a small fraction, the gap is increased when only a small fraction of request messages are flushed.

In accordance with another aspect of the invention, the time between successive potential gap changes is proportional to the absolute value of the gap size currently in effect. Thus, for larger values of the gap, the gap cannot be increased or decreased as frequently as when the gap value is small. In accordance with another aspect of this invention, the proportionally factor before accepting a decision to increase the gap is higher than the proportionality factor for accepting a decision to decrease the gap. This permits rapid increase of the gap size for a sudden overload, while at the same time avoids overshoot, and allows for a smoother recovery from overload. This helps to eliminate large swings in the gap value and provide better performance.

In accordance with another aspect of the invention, the duration interval is chosen proportional to and several times longer than the gap interval. This avoids the problem of a source inadvertently becoming uncontrolled because the duration timer expired before a subsequent response message was received.

In accordance with another aspect of the invention, if the toll switches that generate the messages to the database are only prepared to work with a small number of discrete gaps separated by a large multiple, then the value of the gap that is returned in messages from the database is selected to be one of two adjacent gap values and the fraction of the time during which a lower gap value and a higher gap value is returned is adjusted in an attempt to have an average gap value that is close to optimum. This permits the database to work effectively with a larger number of discrete values of the gap even though the toll switches use a much smaller number of values, and therefore, allows for a more continuous range of gap control. The ideal gap size in overload is an almost continuously varying number. In accordance with one specific embodiment of the invention, the gap value is adjusted every ten seconds. The toll switches accept one of 15 gap values in addition to the gap value 0. The database calculates one of 75 gap values and then sends the adjacent values of gap representing a particular value by a proportionate fraction of the time. For example, if two adjacent gap values at the toll switches are one second and two seconds and the calculated gap value at the database is 1.6 seconds, then the one second value is sent out 40% of the time and the two second value is sent out 60% of the time.

In accordance with another aspect of the invention, at the time when an adjustment of the gap value is calculated, in addition to the three basic values, namely, increase the gap value by one increment, keep the present gap value, or decrease the gap value by one increment, there are additional ranges in which the gap value is increased by two or more. This is especially desirable for the arrangement described above which has 75 different gap values since with such a large number of different gap values, it may be desirable to increase by more than one increment per ten seconds.

BRIEF DESCRIPTION OF THE DRAWING

FIGS. 3 and 4 are flow diagrams of programs for controlling the gap.

DETAILED DESCRIPTION

Figure 1:
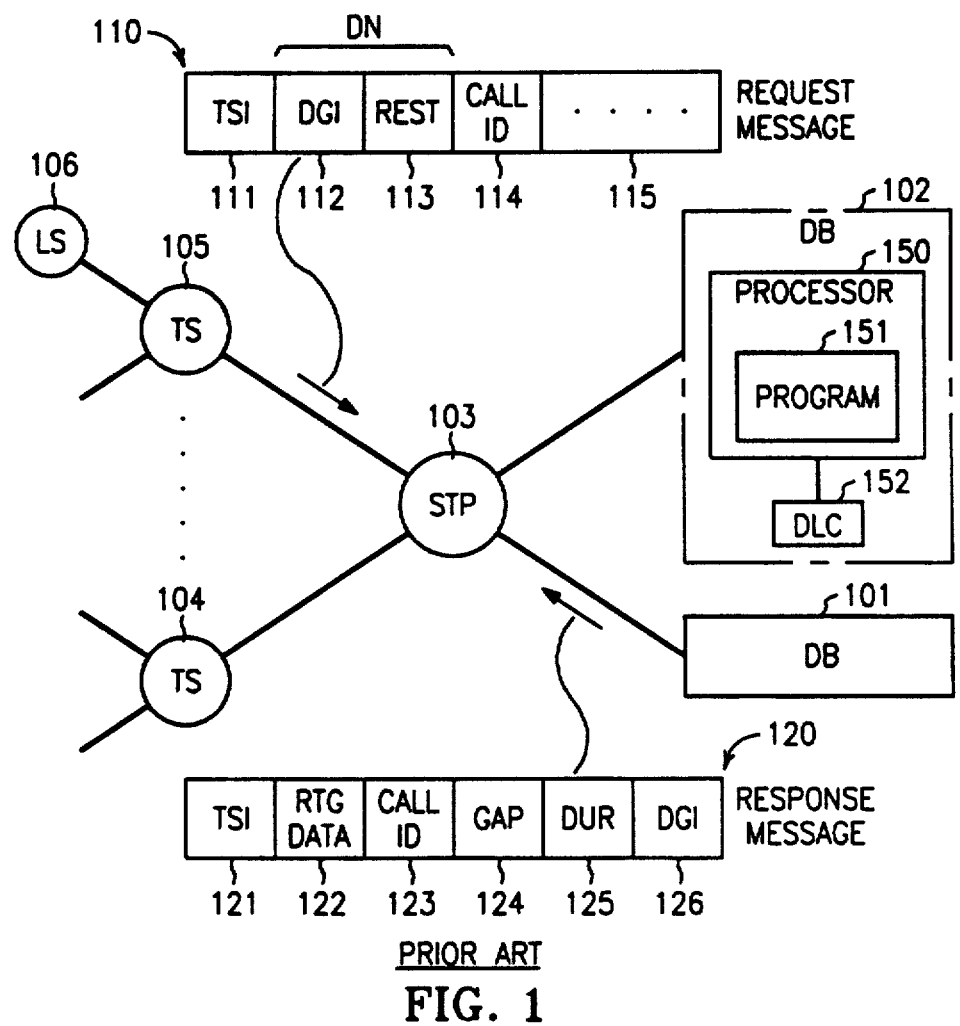
FIG. 1 shows the message interconnection among a group of toll switches and database for requesting data and for controlling a gap used for rejecting traffic.

FIG. 1 is an overall block diagram of the prior art arrangement for communicating among toll switches 104, . . . , 105 via one or more signal transfer points (STP) 103 to one or more databases 101, . . . , 102. The toll switches which receive incoming calls from local switches such as local switch 106, send request messages 110 to a database such as database 101. The request message 110 comprises an identifier of the toll switch 111, a destination group 112, the rest of the number dialed by the customer 113, and a call identifier 114 to associate a subsequent response message with the proper call. The destination group index 112 is used by the STP to route the request message to the appropriate database if more than one database is required for handling the total volume of request messages. In this case, the request message is routed by the signal transfer point to database 101, which receives the request message and responds with response message 120. Database 101 comprises a control processor 150, controlled by a program 151 stored in memory of processor 150, and a data link controller 152 for transmitting and receiving data messages to and from toll switches 104, . . . , 105 via STP 103. Response message 120 includes a toll switch identifier 121, necessary in this case to route the message back via the STP to the appropriate toll switch, routing data 122 supplied by the database to route the call properly, the call identifier 123 equivalent to the call identifier 114 of the request message, a gap value index 124, and a duration value index 125 to be used by the toll switch for regulating traffic to the destination group identified by destination group identifier 126. Although each response message specifies a new gap value provided via the gap value index 124, since the database may flush any given message, the duration index 125 is also provided to maintain a gap, in the absence of new messages, for a period much longer than one gap interval.

Figure 2:
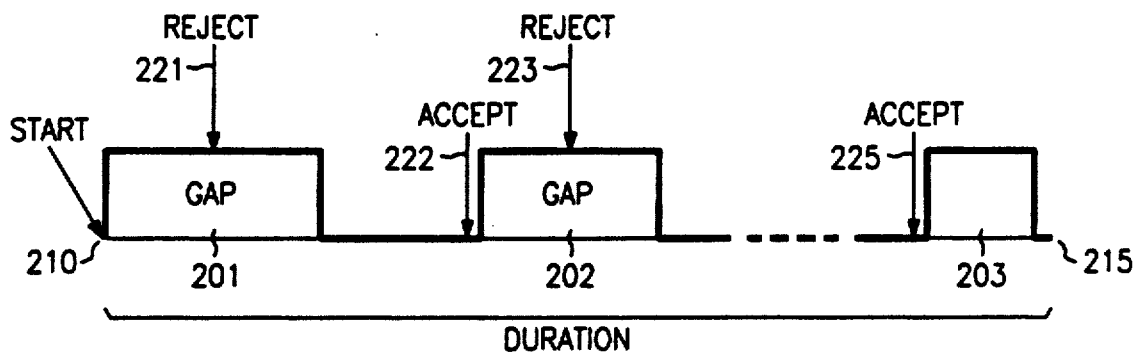
FIG. 2 shows how a gap is used to reject traffic as a function of time.

FIG. 2 shows how the gap and duration values are used in the toll switch. Assume that at time 210 a response message is received by toll switch 105 from database 101 as a result of a database overload, giving non-zero index values to allow the toll switch 105 to determine the size of the gap and the length of the duration. Overload control will then be invoked starting at time 210 and lasting until time 215, times 210 and 215 being separated by the length of the duration as specified by the duration index, unless another response message is received before the duration interval expires; if another response message is received, new values of gap and duration are applied. The gap is turned on initially on receipt of the response message. Assume that during the time of gap 201 that a call arrives at time 221 for the destination group for which the overload control response message has been received. That call will then be rejected; the toll switch will return overflow signal and the call will not be completed. After the gap 201 is completed, the next incoming call to that destination group will be accepted. The first incoming call to that destination group on FIG. 2 is the call arriving at time 222. Following the processing of accepted call 222, another gap 202 is automatically inserted. Any call such as the call 223 occurring during gap 202 will be rejected. The response message for accepted call 222 will provide a new value of the gap and duration index from which new values of the gap and duration may be calculated. These new values will be used and effectively the duration time will start from the time that the response message for call 222 is received. Effectively, a gap is generated after every accepted call during overload as well as after every response message containing a non-zero value is received. Both the value of the gap and the value of the duration are updated with each response message for that destination group. FIG. 2 is also in accordance with the principles of the prior art.

FIG. 3 is a flow diagram of a program, part of program 151, used to implement applicants' invention. Block 300 shows that the gap index is initialized to zero whenever program 151 is rebooted. Block 305 shows that the database is periodically computing the fraction of request messages currently being flushed, i.e., not being processed but being rejected. Every ten seconds, as indicated by block 310, the system checks whether sufficient time has elapsed since the last time the gap index was recalculated for the database. If test 311 indicates that sufficient time has not elapsed, the program exits (block 312). If sufficient time has elapsed, then the flush fraction is read (action block 314). If this flush fraction exceeds a parameter C, then the gap index is incremented by two. If the flush fraction is between C and a lower parameter B, then the gap index is incremented by one. If the flush fraction is between B and a lower parameter A, then the gap index is retained. If the flush fraction is less than A, the gap index is decremented by one (unless the gap index is already 0). The wait timer is then reset (action block 316) to ensure that enough time will elapse before the next recalculation of the gap index, and the program exits (block 317).

In order to have optimum performance for this algorithm, for higher values of the gap, the gap index should be recalculated less frequently. Therefore, test 311 is arranged so that it checks the value of the gap index and converts this into a wait time before making a comparison with the present value of the wait timer. The conversion from the gap index to the wait time is such that the wait time is approximately proportional to the actual gap. In the specific implementation written by the inventors, the wait time is approximately three times the value of the gap.

The gap has a large range of values from 0.1 to 600 seconds. The toll switch selects a gap value on the basis of a 4-bit index supplied by the database in field 124 of response message 120. The database also keeps track of the length of the gap by maintaining its own gap index, which in addition to the 16 possible values that are transmitted to toll switch, has four intermediate values between each pair of such values. This index is used by the database in test 311 to determine whether the elapsed time exceeds the waiting time for a particular gap value and is used to generate the specific gap index that is transmitted in response messages to the toll switch. FIG. 4, a flow diagram of another part of program 151, illustrates this latter process. Every response message includes a gap and a duration index. During periods of light load, these gap and duration indexes are always 0. At any particular instant, the same gap index and same duration index are sent from a given database to any toll switch on any response message for any destination group, served by that database. Block 400 of FIG. 4 illustrates that the database gap index (which includes four intermediate values between each of the 16 values that may be sent to a toll switch) is converted into one of the 16 values that will be sent to toll switches during the next 200 milliseconds. For example. if the database gap index were 3.4, then during a one second interval the value of the gap index of three would be sent during three 200 millisecond intervals and the value four would be sent during the other two 200 millisecond intervals. Block 405 shows that given the gap index, a duration index is selected such that the duration interval will be approximately 8 times the gap interval. As illustrated in block 410, a switch gap index and duration index are transmitted with each response message.

The basic principles of this invention as illustrated herein, i.e., that of adjusting a gap index and therefore indirectly adjusting a gap instead of calculating the absolute value of a gap can also be used for other types of overload control. One of the big problems that faces a communications network administrator is that there are occasional flurries of traffic to destinations which are unprepared to receive such flurries. The extra traffic to these destinations is unproductive and ties up network resources. In order to keep such traffic from the network, it is desirable to detect the presence of such excess traffic and stop such excess traffic from leaving the toll switches. For such situations, the database can detect whether excess traffic to any specific destination is being generated in the network. The database can keep track of how many request messages have been encountered for a particular destination and how many such request messages should be present during periods of high load but not overload. If the number of request messages exceeds this high load value, then the database can invoke gap control for that particular destination by sending a message to each of the toll switches requesting that the toll switch apply gap control to the particular 10-digit number destination for which the overload has been detected. The administration of the gap for that 10-digit number is then performed in the database in accordance with the principles of this invention as described with respect to FIG. 3.

It is to be understood that the above description is only of one preferred embodiment of the invention. Numerous other arrangements may be devised by one skilled in the art without departing from the spirit and scope of the invention. The invention is thus limited only as defined in the accompanying claims.

We claim:

1. In a first system for controlling a gap in a plurality of second systems using gap control to reject overload communication traffic, a method of controlling said gap for said second systems comprising:

in the first system, initializing an indication of a gap value;

measuring a fraction of communication traffic that cannot be processed in the first system;

responsive to said measuring, adjusting the value of the gap upward if the fraction exceeds a first threshold, downward, but not below zero, if the fraction is less than a second threshold and maintaining the value of the gap if the fraction is between the first and second threshold;

transmitting the value of the adjusted gap to the second system;

repeating the measuring, adjusting, and transmitting steps recurrently.

2. The method of claim 1 wherein said adjusting step comprises the step of adjusting the value of the gap upward by one amount if the fraction exceeds a first threshold but is less than a third threshold, and adjusting the value of the gap upward by a second amount if the fraction exceeds the third threshold, the third threshold being larger than the first threshold and the second amount being greater than the first amount.

3. The method of claim 1 wherein said step of repeating recurrently comprises repeating the measuring and adjusting steps more frequently for small values of the gap than for larger values of the gap.

4. The method of claim 3 wherein an interval between successive performance of said measuring step is essentially proportional to the value of the gap.

5. The method of claim 4 wherein said interval is at least a predetermined value.

6. The method of claim 1 wherein the second systems have one set of possible values for the gap and the first system has a second, larger set of possible values including intermediate values, wherein the first system transmits at different times two different values of the first set of values of the gap representing a single intermediate value.

7. In a first system for controlling a gap in a plurality of second systems using gap control to reject overload communication traffic for a particular destination, a method of controlling the gap for rejecting communication traffic to the particular destination in said second systems comprising:

in the first system, initializing an indication of a gap value when traffic to said particular destination exceeds a predetermined value;

in the first system, measuring a fraction of communication traffic that cannot be completed to the particular destination;

responsive to said measuring, adjusting the value of the gap upward if the fraction exceeds a first threshold, downward, but not below zero, if the fraction is less than a second threshold and maintaining the value of the gap if the fraction is between the first and second threshold;

transmitting the value of the adjusted gap to the second systems; and repeating the measuring, adjusting, and transmitting steps recurrently.

8. In a database system, means for controlling a gap value for throttling request message traffic, related to communication traffic, from a plurality of sources, comprising:

means for transmitting said gap value to said plurality of sources; and processor means, operating under control of a program for:

initializing an indication of a gap value;

measuring a fraction of communication traffic that cannot be processed in the database system;

responsive to said measuring, adjusting the value of the gap upward if the fraction exceeds a first threshold, downward, but not below zero, if the fraction is less than a second threshold and maintaining the value of the gap if the fraction is between the first and second threshold;

controlling said means for transmitting to transmit the value of the adjusted gap to the plurality of sources; and repeating the measuring, adjusting, and controlling steps recurrently.

9. In the database system of claim 8, the processor means further operating under control of said program for adjusting the value of the gap upward by one amount if the fraction exceeds a first threshold but is less than a third threshold, and adjusting the value of the gap upward by a second amount if the fraction exceeds the third threshold, the third threshold being larger than the first threshold and the second amount being greater than the first amount.

10. In the database system of claim 8, the processor means further operating under control of said program for repeating the measuring and adjusting more frequently for small values of the gap than for larger values of the gap.

11. In the database system of claim 10, the processor means further operating under control of said program for performing said measuring at a repetition interval that is essentially proportional to the value of the gap.

12. In the database system of claim 11, the processor means further operating under control of said program for performing said measuring at a repetition interval that is at least a predetermined value.

13. In the database system of claim 8, the processor means further operating under control of said program for controlling said means for transmitting to transmit at different times two different values of a gap corresponding to a single gap value, whereby a gap value intermediate between said two different values is effectively transmitted to said plurality of sources.

14. In a database system, means for calculating a gap value for throttling traffic to a particular destination from a plurality of sources, comprising:

means for transmitting messages to said plurality of sources; and processor means operative under the control of a program for:

initializing an indication of a gap value when traffic to said particular destination exceeds a predetermined value;

measuring a fraction of traffic that cannot be completed to the particular destination;

responsive to said measuring, adjusting the value of the gap upward if the fraction exceeds a first threshold, downward, but not below zero, if the fraction is less than a second threshold and maintaining the value of the gap if the fraction is between the first and second threshold;

controlling said means for transmitting to transmit the value of the adjusted gap to the second systems;

repeating the measuring, adjusting, and controlling steps recurrently.

15. In a first system for controlling a gap in a second system, the second system using gap control to reject overload traffic, a method of controlling said gap for said second system comprising:

measuring a fraction of communication traffic that cannot be processed in the first system; and responsive to said measuring, controlling the generation of information for adjusting a previously set gap value in said second system upward if the fraction exceeds a first threshold, downward, but not below zero, if the fraction is less than a second threshold, and for maintaining said gap value if the fraction is between the first and second thresholds.

* * * * *

UNITED STATES PATENT AND TRADEMARK OFFICE
CERTIFICATE OF CORRECTION

PATENT NO. : 5,067,074

DATED : November 19, 1991

INVENTOR(S) : Richard A. Farel, Mohan Gawande

It is certified that error appears in the above-identified patent and that said Letters Patent is hereby corrected as shown below:

Column 8, claim 14, line 48, after "throttling" insert --communication--.

Column 8, claim 14, line 54, after "when" insert -- communication--.

Column 8, claim 14, line 57, after "of" insert --communication--.

Signed and Sealed this

Sixth Day of April, 1993

Attest:

STEPHEN G. KUNIN

*Attesting Officer*  *Acting Commissioner of Patents and Trademarks*